US012658981B2

(12) United States Patent
Li et al.

(10) Patent No.: US 12,658,981 B2
(45) Date of Patent: Jun. 16, 2026

(54) AIR-GROUND CO-FREQUENCY SYSTEM INTERFERENCE SUPPRESSION METHOD AND APPARATUS, ELECTRONIC DEVICE, AND READABLE MEDIUM

(71) Applicant: ZTE CORPORATION, Shenzhen (CN)

(72) Inventors: Bin Li, Shenzhen (CN); Feng Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 302 days.

(21) Appl. No.: 18/289,238

(22) PCT Filed: Apr. 6, 2022

(86) PCT No.: PCT/CN2022/085304
§ 371 (c)(1),
(2) Date: Nov. 2, 2023

(87) PCT Pub. No.: WO2022/242346
PCT Pub. Date: Nov. 24, 2022

(65) Prior Publication Data
US 2024/0259050 A1 Aug. 1, 2024

(30) Foreign Application Priority Data
May 19, 2021 (CN) .......................... 202110547060.5

(51) Int. Cl.
*H04B 7/04* (2017.01)
*H04B 7/185* (2006.01)

(52) U.S. Cl.
CPC ..... *H04B 7/04013* (2023.05); *H04B 7/18506* (2013.01)

(58) Field of Classification Search
CPC ..... H04W 24/08; H04W 16/26; H04B 17/309
See application file for complete search history.

(56) References Cited

U.S. PATENT DOCUMENTS

2022/0321198 A1* 10/2022 Devoti ............... H04B 7/04013
2024/0171222 A1* 5/2024 Capolino ........... H01Q 15/0066

* cited by examiner

*Primary Examiner* — Sulaiman Nooristany
(74) *Attorney, Agent, or Firm* — Li & Cai Intellectual Property (USA) Office

(57) ABSTRACT

The disclosure provides air-ground co-frequency system interference suppression method. The method includes: determining base station set of ground radio communication system corresponding to first base station of ATG system, where each second base station in base station set and first base station interfere with each other; determining, for at least one second base station, location of RIS device corresponding to second base station, and determining incident angle of incident beam of interference signal incident to RIS device; and determining, according to interference signal and incident angle of incident beam of interference signal, weight information of reflected beam of interference cancellation signal so that RIS device reflects incident beam of interference signal according to weight information, to form reflected beam of interference cancellation signal to eliminate interference signal. The disclosure further provides air-ground co-frequency system interference suppression apparatus, electronic device, and readable medium.

19 Claims, 4 Drawing Sheets

Determine a base station set of a ground radio communication system corresponding to a first base station of an ATG system, where each second base station in the base station set and the first base station interfere with each other — S11

Determine, for at least one second base station, a location of an RIS device corresponding to the second base station, and determine an incident angle of an incident beam of an interference signal incident to the RIS device — S12

Determine, according to the interference signal and the incident angle of the incident beam of the interference signal, weight information of a reflected beam of an interference cancellation signal so that the RIS device reflects the incident beam of the interference signal according to the weight information, to form the reflected beam of the interference cancellation signal to eliminate the interference signal — S13

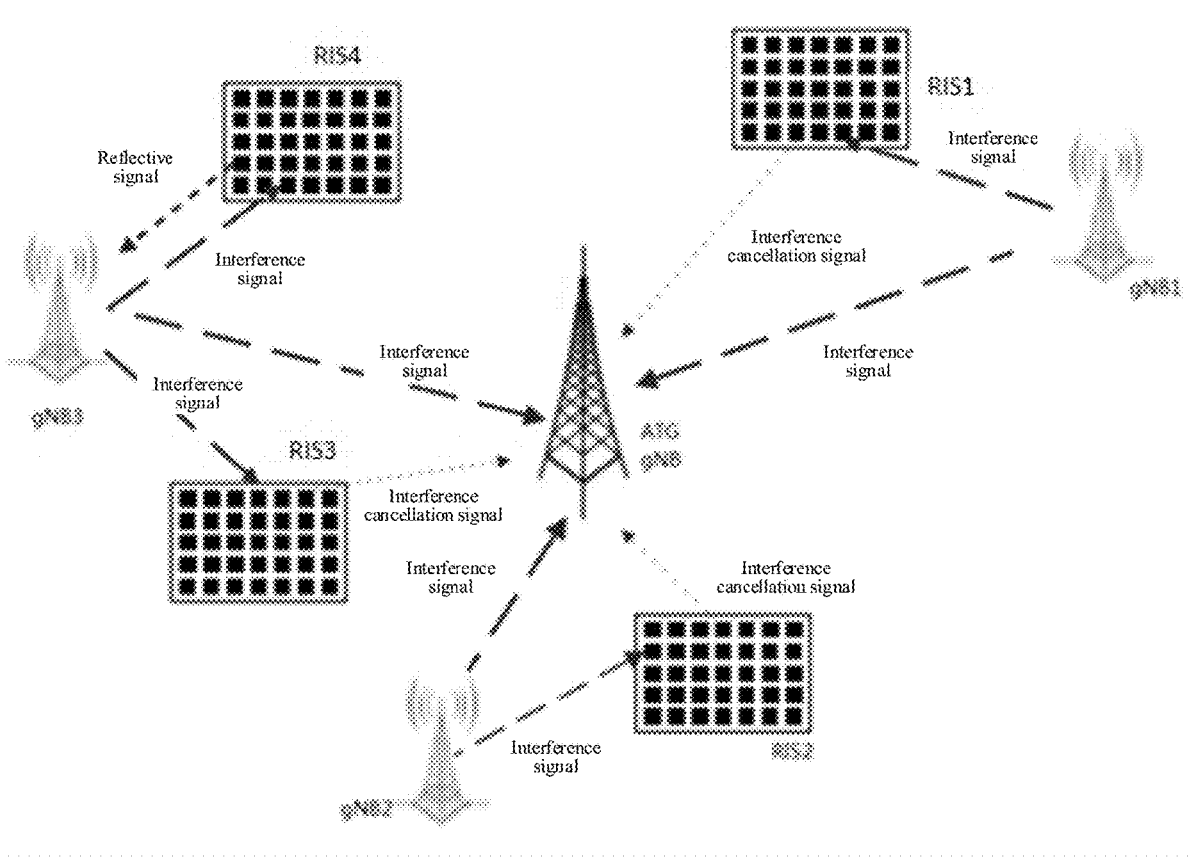
FIG. 7b
First processing module `101` — Second processing module `102` — Third processing module `103`
FIG. 8
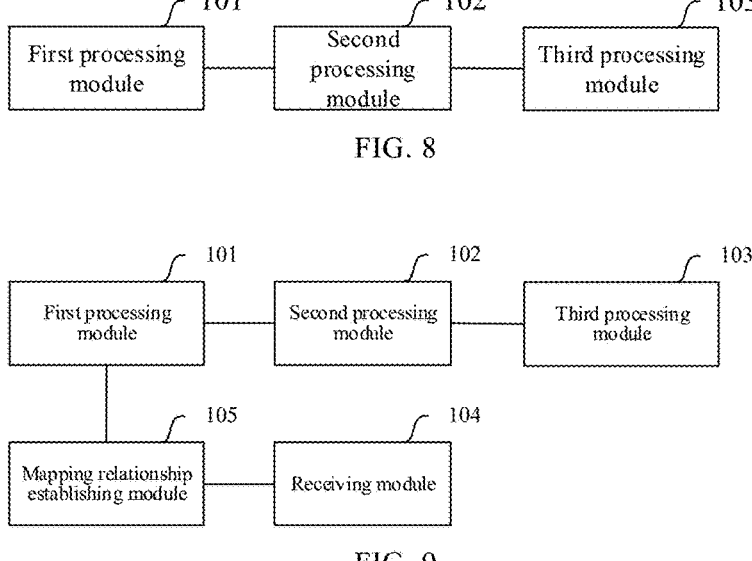
FIG. 9

AIR-GROUND CO-FREQUENCY SYSTEM INTERFERENCE SUPPRESSION METHOD AND APPARATUS, ELECTRONIC DEVICE, AND READABLE MEDIUM

CROSS-REFERENCE TO RELATED APPLICATIONS

The present disclosure is a National Phase Application filed under 35 U.S.C. 371 as a national state of PCT/CN2022/085304, filed on Apr. 6, 2022, an application claiming the priority to the patent application No. 202110547060.5 filed with the Chinese Patent Office on May 19, 2021, the entire contents of which are incorporated hereby by reference.

TECHNICAL FIELD

The present disclosure relates to, but is not limited to, the field of communication technology.

BACKGROUND

With the rapid development of the radio communication technology, spectrum resources become more and more precious. National governments are putting more and more strict management on authority and use of the spectrum resources, while the costs involved in authority of spectrum resources and the like are increasingly higher. In many regions around the world, the radio spectrum resources are relatively scarce and expensive, and many medium and small operators cannot obtain enough, high-quality and continuous spectrum resources, which brings great difficulties in building of a radio communication system, especially some private networks (such as ocean-facing, high-speed railway and ground-to-air radio communication networks), and thus limits the network capacity.

The internet access at any place and any time has become one of the greatest demands of people. Compared with the wide network coverage on the ground, passengers on an airplane are difficult to enjoy high-speed internet connection like those on automobiles and trains, which is mainly owed to the lack of air coverage of radio networks. For a terminal like an airplane moving at an ultra-high speed (800 to 1200 Km/h), air to ground (ATG) systems based on 3G, 4G and 5G communication systems have been developed in the industry, and commercially deployed and put into experimental flights in China, the European Union, the United States and other countries and regions.

SUMMARY

The present disclosure provides an air-ground co-frequency system interference suppression method and apparatus, an electronic device, and a readable medium.

In a first aspect, the present disclosure provides an air-ground co-frequency system interference suppression method, including: determining a base station set of a ground radio communication system corresponding to a first base station of an air to ground (ATG) system, wherein each second base station in the base station set and the first base station interfere with each other; determining, for at least one second base station in the base station set, a location of a reconfigurable intelligent surface (RIS) device corresponding to the second base station, and determining an incident angle of an incident beam of an interference signal incident to the RIS device; and determining, according to the interference signal and the incident angle of the incident beam of the interference signal, weight information of a reflected beam of an interference cancellation signal so that the RIS device reflects the incident beam of the interference signal according to the weight information, to form the reflected beam of the interference cancellation signal to eliminate the interference signal.

In another aspect, the present disclosure further provides an air-ground co-frequency system interference suppression apparatus, including a first processing module, a second processing module and a third processing module, wherein the first processing module is configured to determine a base station set of a ground radio communication system corresponding to a first base station of an air to ground (ATG) system, wherein each second base station in the base station set and the first base station interfere with each other; the second processing module is configured to determine, for at least one second base station in the base station set, a location of a reconfigurable intelligent surface (RIS) device corresponding to the second base station, and determine an incident angle of an incident beam of an interference signal incident to the RIS device; and the third processing module is configured to determine, according to the interference signal and the incident angle of the incident beam of the interference signal, weight information of a reflected beam of an interference cancellation signal so that the RIS device reflects the incident beam of the interference signal according to the weight information, to form the reflected beam of the interference cancellation signal to eliminate the interference signal.

In yet another aspect, the present disclosure further provides an electronic device, including: one or more processors; a storage means having one or more programs stored thereon; wherein the one or more programs, when executed by the one or more processors, cause the one or more processors to implement the air-ground co-frequency system interference suppression method as described herein.

In still another aspect, the present disclosure further provides a computer-readable medium storing a computer program thereon, wherein the program, when executed by a processor, cause the air-ground co-frequency system interference suppression method as described herein to be implemented.

BRIEF DESCRIPTION OF DRAWINGS

FIG. 7*b* is a schematic diagram of implementing interference suppression of a base station of ground NR system to a base station of ATG system using an active RIS according to the present disclosure;

FIG. 8 is a schematic structural diagram of an air-ground co-frequency system interference suppression apparatus according to the present disclosure; and FIG. 9 is a schematic structural diagram of an air-ground co-frequency system interference suppression apparatus according to the present disclosure.

DETAIL DESCRIPTION OF EMBODIMENTS

Figure 1:
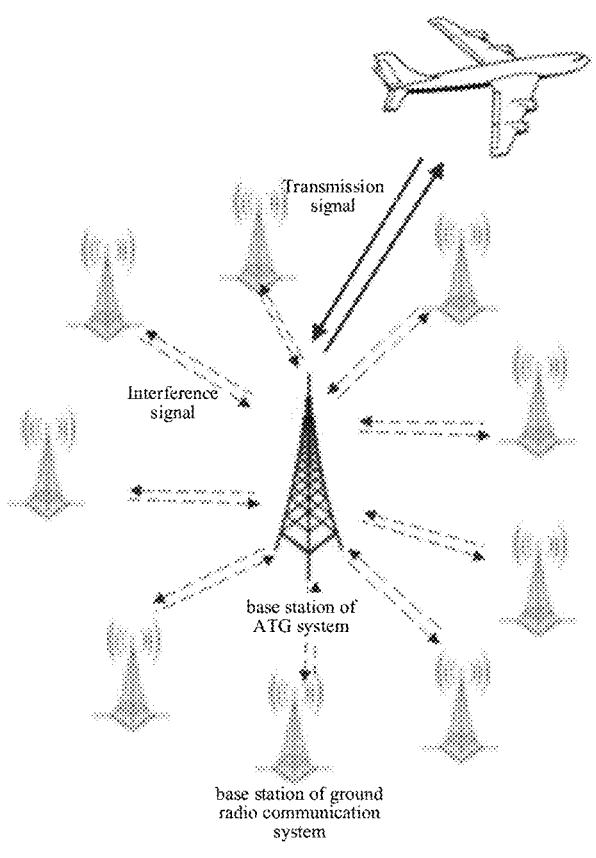
FIG. 1 is a schematic diagram showing mutual interference between an ATG system and a ground radio communication system.

Example implementations will be described more sufficiently below with reference to the accompanying drawings, but which may be embodied in different forms and should not be construed as limited to the implementations set forth herein. Rather, these implementations are provided so that the present disclosure will be thorough and complete, and will fully convey the scope of the present disclosure to those skilled in the art.

As used herein, the term "and/or" includes any and all combinations of one or more of the associated listed items.

The terminology used herein is for the purpose of describing specific implementations only and is not intended to limit the present disclosure. As used herein, the singular forms "a", "an" and "the" are intended to include the plural forms as well, unless the context clearly indicates otherwise. It will be further understood that as used herein, the terms "include" and/or "made of . . . " specify the presence of stated features, integers, steps, operations, elements, and/or components, but do not preclude the presence or addition of one or more other features, integers, steps, operations, elements, components, and/or groups thereof.

The implementations described herein may be described with reference to plan and/or sectional views in idealized representations of the present disclosure. Accordingly, the example illustrations may be modified in accordance with manufacturing techniques and/or tolerances. Accordingly, the implementations are not limited to the implementations shown in the drawings, but include modifications of configurations formed based on manufacturing processes. Thus, the regions illustrated in the figures have schematic properties, and the shapes of the regions shown in the figures illustrate specific shapes of regions of elements, but are not intended to be limiting.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

Since frequency resources are very precious for operators and independent frequency resources cannot be allocated to industries such as an ATG system, establishing an ATG system sharing the same spectrum with a ground radio communication system on a shared spectrum is an acceptable comprehensive solution for all parties. As shown in FIG. 1, most existing ATG systems and the like multiplex frequencies with ground 4G and 5G communication systems, which cannot avoid the inter-system interference problem and may deteriorate the performance of each system. Therefore, the existing interference avoidance strategy is desired to be further optimized.

An existing air-ground co-frequency system interference suppression scheme involves remotely isolating a base station of ATG system from a base station of ground radio communication system in a physical isolation manner, which generally includes locating the base station of ATG system in a remote area and thus has the problems of high requirements on site selection of the base station of ATG system and high construction cost. Another existing air-ground co-frequency system interference suppression scheme involves suppressing signal transmission of the base station of ATG system in a beam suppression manner, but would be at the cost of reducing the physical performance of the ATG system.

Reconfigurable intelligent surface (RIS) is a revolutionary technology which integrates a large number of low-cost passive or active reflective elements on a plane to enable a capability of intelligently changing the radio propagation environment, and thus remarkably improve the performance of the radio communication network. The essence of RIS technology is to control amplitudes and/or phases of the different elements to reflect or transmit incident signals independently, thereby enabling a passive beam forming for enhanced or null signals in collaboration and enabling an intelligent and programmable radio environment.

In order to suppress the interference of an air-ground co-frequency system and solve the problems of high requirements on site selection of a base station of ATG system and high cost, as well as the influenced physical performance of the ATG system, the present disclosure introduces an RIS device which can reduce the mutual interference between the ATG system and the co-frequency ground radio communication system, and thus improve the system performance. In the present disclosure, the ATG system and the RIS device are jointly used to implement interference suppression of an air-ground co-frequency communication system, and by deploying the RIS device and optimizing selections in the placement location of the RIS device and weight information of the reflected beam, mutual interference of the air and ground radio systems are reduced, and the system performance of each radio system is thus further improved.

Figure 2:
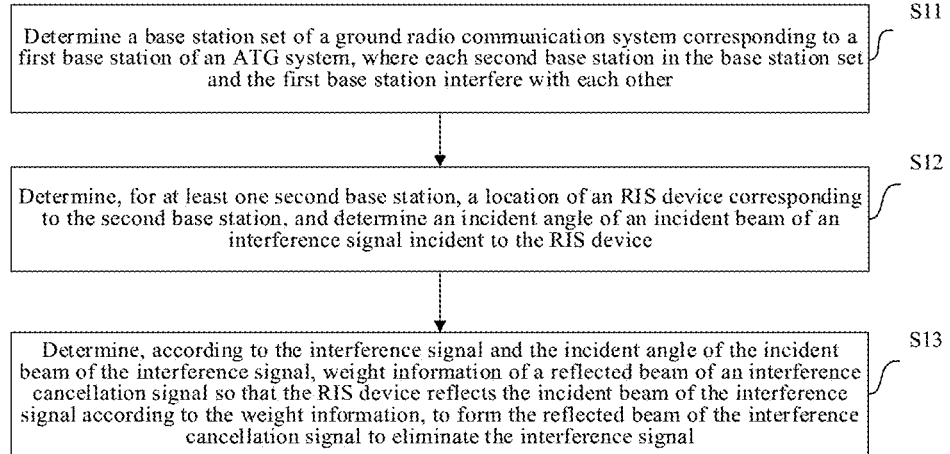
FIG. 2 is a schematic flowchart of an air-ground co-frequency system interference suppression method according to the present disclosure.

The present disclosure provides an air-ground co-frequency system interference suppression method, which is applied to a scene where an ATG system and a ground radio communication system share the same spectrum resource. As shown in FIG. 2, the air-ground co-frequency system interference suppression method includes the following operations S11 to S13.

At operation S11, a base station set of a ground radio communication system corresponding to a first base station of an ATG system is determined, where each second base station in the base station set and the first base station interfere with each other.

Generally, a base station of ATG system has a cell coverage radius much larger than that of a base station of ground radio communication system. Therefore, a plurality of base stations of ground radio communication system are typically provided around each base station of ATG system. In this operation, a base station(s) (i.e., the second base station(s)) of ground radio communication system having greater interference with a base station (i.e., the first base station) of ATG system is (are) selected from a plurality of base stations of ground radio communication system corresponding to the base station of ATG system to form a base station set.

In this operation, for each first base station in the ATG system, a set of high interference base station(s) (including at least one second base station) of the ground radio communication system corresponding to the first base station is determined. In some implementations, the set of high interference base station(s) of the ground radio communication system may be determined according to an interference measurement method for the ATG system and the ground radio communication system, including but not limited to, a measurement angle, an estimated time offset or other parameters. It should be noted that in an actual ATG system, a great number of first base stations are provided, a set of co-frequency and high interference base station(s) of the ground radio communication system corresponding to each first base station is determined for the first base station through the above operations, and the number of base stations in each base station set is not necessarily the same.

At operation S12, for at least one second base station in the base station set, a location of an RIS device corresponding to the second base station is determined, and an incident angle of an incident beam of an interference signal incident to the RIS device is determined.

In some implementations, at least one RIS device may be configured for each second base station. In this operation, an incident angle of an incident beam of an interference signal incident to the RIS device may be determined from a location of the first base station of the ATG system, a location of the second base station of the ground radio communication system, and a location of the RIS device.

At operation S13, weight information of a reflected beam of an interference cancellation signal is determined according to the interference signal and the incident angle of the incident beam of the interference signal, so that the RIS device reflects the incident beam of the interference signal according to the weight information, to form the reflected beam of the interference cancellation signal to eliminate the interference signal.

In this operation, the weight information of the reflected beam of the interference cancellation signal may be determined based on the principle of minimizing interference or the like.

The present disclosure provides an air-ground co-frequency system interference suppression method, including: determining a base station set of a ground radio communication system corresponding to a first base station of an ATG system, where each second base station in the base station set and the first base station interfere with each other; determining, for at least one second base station in the base station set, a location of a reconfigurable intelligent surface (RIS) device corresponding to the second base station, and determining an incident angle of an incident beam of an interference signal incident to the RIS device; and determining, according to the interference signal and the incident angle of the incident beam of the interference signal, weight information of a reflected beam of an interference cancellation signal so that the RIS device reflects the incident beam of the interference signal according to the weight information, to form the reflected beam of the interference cancellation signal to eliminate the interference signal. In the present disclosure, on the premise of implementing air-ground co-frequency system interference suppression, the requirements on site selection of the base station of ATG system as well as the cost are reduced, and the physical performance of the ATG system will not be influenced.

In the present disclosure, the RIS device may be an active device or a passive device. For an active RIS device, the weight information of a reflected beam is variable, and accordingly, the reflected beam is also variable. For a passive RIS device, the weight information of a reflected beam is written into the passive RIS device once determined and cannot be modified, and accordingly, the reflected beam remains unchanged.

In some implementations, when the RIS device is an active device, after determining the weight information of the reflected beam of the interference cancellation signal, the method further includes: sending the weight information to the RIS device. In this manner, the active RIS device can form a reflected beam of an interference cancellation signal according to the weight information and thus implement interference suppression.

When the incident direction of the incident beam of the interference signal changes, in the case of an active RIS device, the interference cancellation signal may be adaptively adjusted by adjusting the weight information of the reflected beam, namely, the transmitted beam may be adaptively adjusted according to the incident directions of incident beams of different interference signals; and in the case of a passive RIS device, a new RIS device is additionally added to generate a new reflective beam of an interference cancellation signal, namely, more RIS devices are deployed to ensure interference suppression in different directions.

It should be noted that, in some implementations, when the RIS device has higher performance, after the location of the RIS device corresponding to the second base station is determined, information about each second base station in the base station set may be transmitted to the corresponding RIS device which determines an incident angle of an incident beam of the interference signal, determines weight information of a reflected beam of the interference cancellation signal, and reflects the incident beam of the interference signal according to the weight information to form the reflected beam of the interference cancellation signal.

In some implementations, determining the weight information of the reflected beam of the interference cancellation signal (i.e., operation S13) includes: calculating the weight information of the reflected beam of the interference cancellation signal with a minimum interference-to-noise ratio algorithm.

The base station of ATG system generally uses a large-scale multiple-in multiple-out (MIMO) antenna system, where MIMO antennas divide a space into a plurality of grids each corresponding to a set of antenna weights (expressed in a matrix), so as to represent different wave incoming directions in the space.

Figure 3:
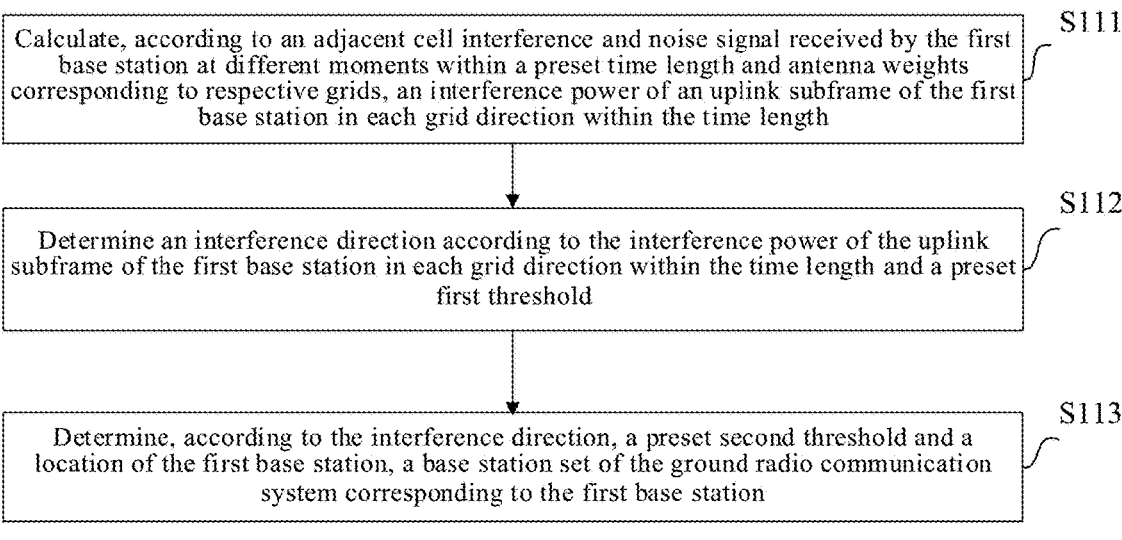
FIG. 3 is a schematic flowchart of determining a base station set of a ground radio communication system corresponding to a first base station of an ATG system according to the present disclosure.

When the ground radio communication system is a new radio (NR) or long term evolution (LTE) communication system, as shown in FIG. 3, determining the base station set of the ground radio communication system corresponding to the first base station of the ATG system (i.e., operation S11) includes the following operations S111 to S113.

At operation S111, an interference power of an uplink subframe of the first base station in each grid direction within a preset time length is calculated according to an adjacent cell interference and noise signal received by the first base station at different moments within the preset time length and antenna weights corresponding to respective grids.

In this operation, the adjacent cell interference and the noise signal received by the first base station at a certain moment within a preset time length are multiplied by the antenna weights corresponding to the grids, respectively, to obtain weighted interference data of each grid at that moment. Then, power calculation is performed on the weighted interference data of the grid at each moment within the preset time length, to obtain an interference power of an uplink subframe of the first base station in each grid direction within the preset time length.

No local cell data scheduling is performed on several uplink subframes, and the received data includes merely the adjacent cell interference and noise signal I(t). In this case, each set of antenna weights is multiplied by the received data of each antenna to obtain the weighted received interference data of each grid, and then, power calculation is performed on the weighted received interference data of each grid within the preset time length to obtain an interference power of an uplink subframe of the first base station in each grid direction within the preset time length.

In some implementations, the interference power of the uplink subframe of the first base station in each grid direction within the preset time length may be calculated by the following equation (1):

$$NI_i = \sum_t |I(t) * Q_i^H|^2 \qquad (1)$$

where $NI_i$ is an interference power of an uplink subframe of the first base station in each grid direction within the preset time length, I(t) is an adjacent cell interference and noise signal received by the first base station at a moment t, $Q_i^H$ is a transposed matrix of antenna weights corresponding to a grid i, t is a moment within the preset time length, and i is an identifier of a grid divided by the MIMO antennas of the first base station.

At operation S112, an interference direction is determined according to the interference power of the uplink subframe of the first base station in each grid direction within the time length and a preset first threshold.

In this operation, the interference power of the uplink subframe of the first base station in each grid direction within the time length is compared with a preset first threshold (i.e., a power threshold), to determine a grid direction(s) corresponding to an interference power greater than the first threshold as a direction(s) (i.e., an interference direction(s)) of a high interference base station set (or a set of high interference base station(s)) of a ground radio communication system.

In some implementations, the first threshold may be −100 dBm/RE.

At operation S113, a base station set of the ground radio communication system corresponding to the first base station is determined according to the interference direction, a preset second threshold and a location of the first base station.

In this operation, a base station of the ground radio communication system located in the interference direction and at a second threshold (or distance) from the first base station is selected as the second base station, and a base station set of the ground radio communication system corresponding to the first base station is formed according to each second base station.

In some implementations, when the ground radio communication system is an NR communication system, determining the base station set of the ground radio communication system corresponding to the first base station of the ATG system (i.e., operation S11) includes: determining, according to a mapping relationship between an identifier of the first base station and an identifier of the second base station, a base station set of the ground radio communication system corresponding to the first base station of the ATG system. That is, for a 5G NR ground radio communication system, instead of calculating the interference power in each grid direction of the antenna, the high interference base station of the ground radio communication system corresponding to the base station of ATG system may be determined directly from a mapping relationship between the base station of ATG system and the base station of NR ground radio communication system.

Figure 4:
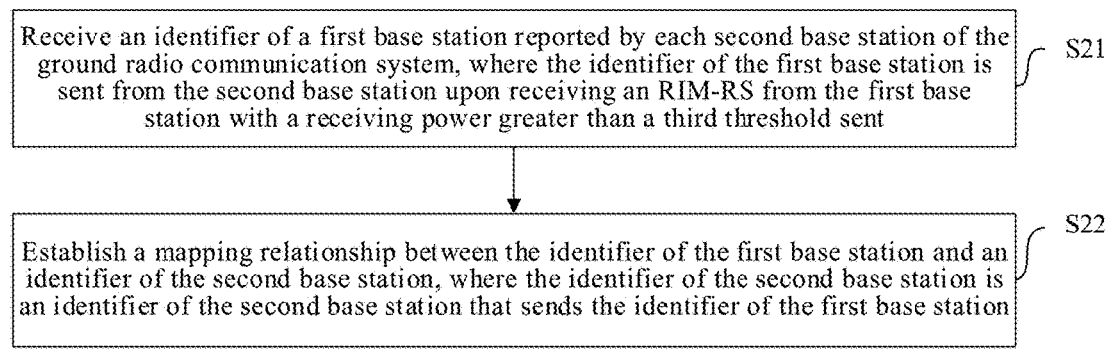
FIG. 4 is a schematic flowchart of establishing a mapping relationship between an identifier of the first base station and an identifier of the second base station according to the present disclosure.

In some implementations, as shown in FIG. 4, the operation of establishing the mapping relationship may include operations S21 and S22.

At operation S21, an identifier of the first base station reported by each second base station of the ground radio communication system is received, where the identifier of the first base station is sent from the second base station upon receiving from the first base station a remote interference management reference signal (RIM-RS) with a receiving power greater than a third threshold.

All base stations of NR system support transmission and detection of an RIM-RS, so the first base station of the ATG system can obtain a set of ground base stations generating high interference with the first base station by detecting the RIM-RS.

In this operation, the first base station periodically transmits an RIM-RS which includes identifier information of the first base station, and a base station of ground radio communication system around the first base station correspondingly receives the RIM-RS, and compares the receiving power of the RIM-RS with a preset power threshold (i.e., the third threshold). If the receiving power of the RIM-RS is greater than the third threshold, the base station of ground radio communication system and the first base station are considered to be high interference base stations to each other, and the base station of ground radio communication system reports an identifier of the first base station.

At operation S22, a mapping relationship between the identifier of the first base station and an identifier of the second base station is established, where the identifier of the second base station is an identifier of the second base station that sends the identifier of the first base station.

In this operation, a mapping relationship between the identifier of the first base station and an identifier of the second base station reporting the identifier of the first base station is established, and a second base station(s) corresponding to the first base station is (are) recorded according to the mapping relationship to form a base station set.

In some implementations, determining the location of the RIS device corresponding to the second base station (i.e., operation S12) includes: selecting a peripheral location of the second base station or the first base station, and setting the selected location as a location of the RIS device corresponding to the second base station. In other words, an RIS device is disposed near the base station (i.e., the first base station) of ATG system, or an RIS device is disposed near the high interference base station (i.e., the second base station) of ground radio communication system, and the first base station, the second base station, and the corresponding RIS device may be arranged in a line or may have an angle therebetween.

To achieve a better interference suppression effect, in some implementations, the location of the RIS device corresponding to the second base station is on a line of sight (LOS) radio transmission path between the first base station and the second base station. Accordingly, the direction of the reflected beam of the interference cancellation signal may be opposite to the direction of the incident beam of the interference signal.

The interference signal includes a first interference signal of the first base station to the second base station, and a second interference signal of the second base station to the first base station. The interference cancellation signal includes a first interference cancellation signal of the first base station to the second base station, and a second interference cancellation signal of the second base station to the first base station. The weight information includes first weight information of a first reflected beam of the first interference cancellation signal, and second weight information of a second reflected beam of the second interference cancellation signal.

When the RIS device is an active device, in order to enable the RIS device to better enhance interference suppression between the base station of ATG system and the base station of ground radio communication system, in some implementations, the RIS device may be made to determine a timing of forming a reflected beam of the interference cancellation signal according to radio frame structures of the ATG system and the ground radio communication system.

In some implementations, sending the weight information to the RIS device so that the RIS device reflects the incident beam of the interference signal according to the weight information, to form the reflected beam of the interference cancellation signal includes: sending the first weight information and the second weight information to the RIS device so that at a moment where the ATG system is at a downlink slot and the ground radio communication system is at an uplink slot, the RIS device reflects an incident beam of the first interference signal according to the first weight information to form a first reflected beam of the first interference cancellation signal, and at a moment where the ground radio communication system is at a downlink slot and the ATG system is at an uplink slot, the RIS device reflects an incident beam of the second interference signal according to the second weight information to form a second reflected beam of the second interference cancellation signal.

Figure 5:
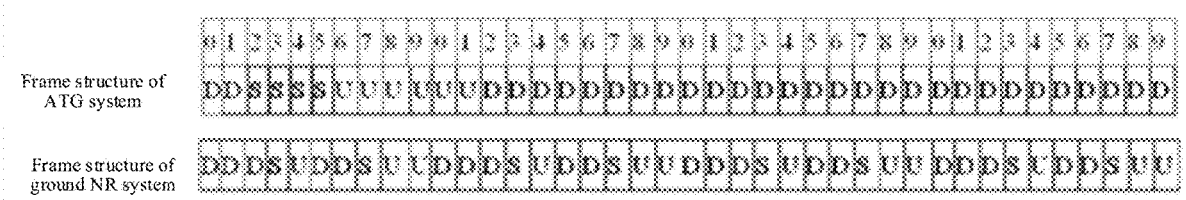
FIG. 5 is a schematic diagram of frame structures of an ATG system and a ground NR system according to the present disclosure.

Taking the ground radio communication system being an NR system as an example, as shown in FIG. 5, the ATG system employs a radio frame structure of a 20 ms period, where each cell in the figure represents a timeslot of 0.5 ms, and D/S/U represents downlink, special, and uplink timeslots, respectively. The ground NR system adopts a frame structure of 2.5 ms double periods. It can be seen that the situation of maximum interference where a downlink transmission from a base station of one system interferes with uplink receiving of the other system still exists even if the two systems adopt a synchronous mode. On this basis, an active RIS device is introduced so that at a moment where the ATG system is at a downlink slot and the ground NR system is at an uplink slot, the first weight information is enabled to form a first reflected beam of the first interference cancellation signal; and at a moment where the ground NR system is at a downlink slot and the ATG system is at an uplink slot, the second weight information is enabled to form a second reflected beam of the second interference cancellation signal.

To clearly explain the solution of the present disclosure, the air-ground co-frequency system interference suppression method of the present disclosure is described in detail with reference to FIGS. 6 and 7a to 7b taking the instances of implementing interference suppression using a passive RIS device in an LTE system and implementing interference suppression using an active RIS device in an ATG system and a ground NR system as examples.

Figure 6:
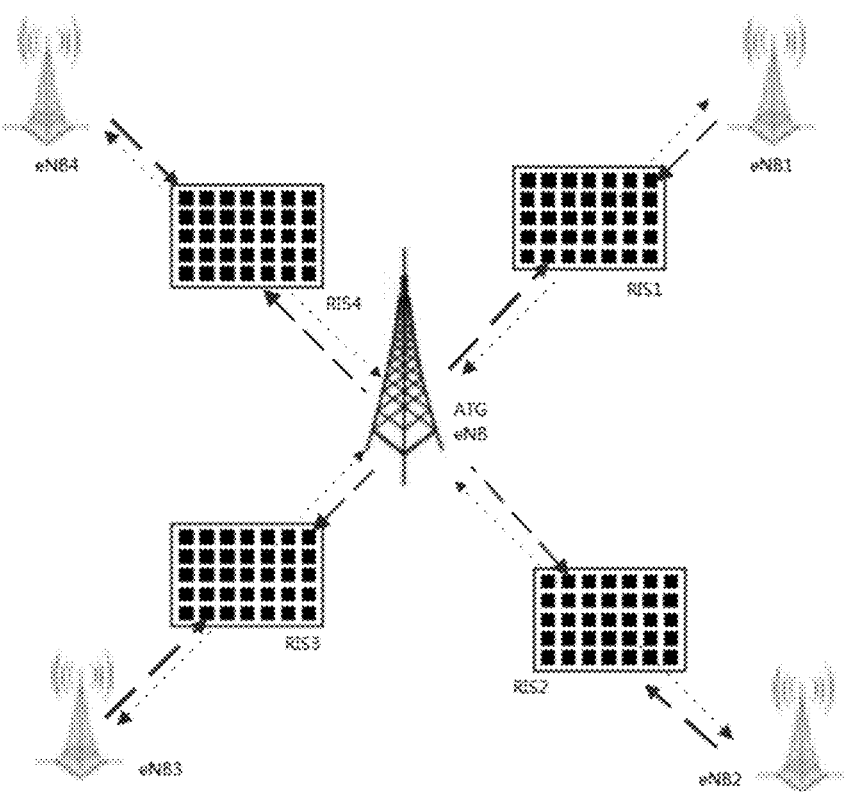
FIG. 6 is a schematic diagram of implementing interference suppression using a passive RIS device in an LTE system according to the present disclosure.

FIG. 6 is a schematic diagram of implementing interference suppression using a passive RIS device in an LTE system. As shown in FIG. 6, both the ATG system and the ground LTE system are time division duplexing (TDD) systems and share the same 2.6 G frequency band. Due to different cell coverage distances, the situation of maximum interference where a downlink transmission from a base station of one system interferes with uplink receiving of the other system exists between the two radio systems, and thus, a passive RIS device is introduced.

In operation 1, firstly, for each base station (ATG eNB) of ATG system, a set of base station(s) of an LTE system which generate(s) high interference with the base station (ATG eNB) is selected. Generally, a base station of ATG system has a cell coverage radius much larger than that of a base station of LTE system, resulting in a plurality of base stations of LTE system provided around each base station of ATG system. Here, base stations of LTE system having higher interference with the base station of ATG system are selected to form a base station set. The selection in the implementation is performed as follows: 64 MIMO antennas of the ATG eNB are provided and may divide the space into 32 grids which represent different wave incoming directions of the space (vertically divided into 4 groups, and horizontally divided into 8 groups) and correspond to 32 sets of antenna weights: $Q_i=\{Q_1, Q_2, \ldots, Q_{32}\}$, i=1, 2, ..., 32. The interference power $NI_i$ of the uplink subframe of the first base station in each grid direction within the preset time length is calculated by the equation (1), and a grid direction with an interference power greater than –100 dBm/RE is determined as an interference direction. The interference direction includes the 4 directions shown in FIG. 6. base stations eNB1, eNB2, eNB3 and eNB4 of LTE system, which are located in the 4 interference directions and away from the first base station ATG eNB by a second threshold (or distance) are selected as high interference ground base stations (second base stations), and form a base station set (including eNB1, eNB2, eNB3 and eNB4) of the LTE system corresponding to that ATG eNB.

In operation 2, an RIS device is placed for each of the high interference ground base stations eNB1, eNB2, eNB3 and eNB4 selected in the previous operation. The RIS devices are placed on LOS paths between the ATG eNB and the second base stations, and locations of eNB1, eNB2, eNB3 and eNB4 are as shown in FIG. 6. When the locations of the respective RIS devices are determined, the incident angles of the incident beams of the interference signals are also determined from the locations of the RIS devices, the ATG eNB, and the second base stations.

In operation 3, according to the location of each of the RIS devices and the interference signal and the incident angle of the incident beam of the interference signal, the weight of the passive RIS device is merely desired to satisfy that the reflected beam is reflected along an incident direction of the incident beam, and thereby, weight information of a reflected beam of an interference cancellation signal is determined. The fixed reflected beam of the RIS device is designed to be perpendicular to a panel of the RIS device, and the resulted reflection effect is as shown in FIG. 6, where the dashed line represents an incident beam of the interference signal, and the dotted line represents a reflected beam of the interference cancellation signal.

In operation 4, upon receiving the incident beam of the interference signal, the RIS device forms the reflected beam of the interference cancellation signal based on the weight information, and emits the reflected beam according to the incident direction of the incident beam.

Through the introduction and deployment of the passive RIS device, the interference between the ATG system and the ground LTE system is obviously suppressed, and the performance of both systems is further improved.

Figure 7A:
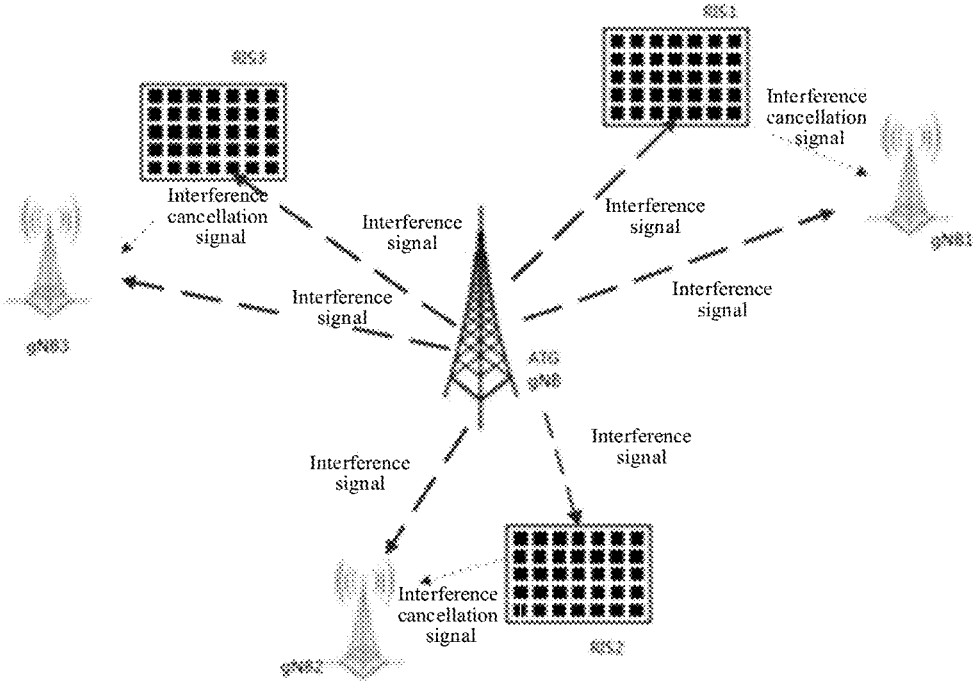
FIG. 7*a* is a schematic diagram of implementing interference suppression of a base station of ATG system to a base station of ground NR system using an active RIS according to the present disclosure.

FIGS. 7a to 7b are schematic diagrams of implementing interference suppression of an ATG system and a ground NR system using an active RIS device. Both the ATG system and the ground NR system are TDD systems and share the same 4.9 G frequency band. The two communication systems have different cell coverage distances, and adopt different radio frame structures, such as the radio frame structures shown in FIG. 5. It can be seen that the situation of maximum interference where a downlink transmission from base station of one system interferes with uplink receiving of the other system still exists even if the two systems adopt a synchronous mode. Thus, an active RIS device is introduced.

In operation 1, since the base station gNB of ground NR system supports transmission and detection of RIM-RSs, a set of ground base stations that generate high interference to a base station gNB of ATG system may be obtained by transmitting RIM-RSs by the base station gNB of ATG system. The specific method is as follows: the ATG gNB periodically transmits an RIM-RS which includes an ID of the ATG gNB, and a base station gNB of ground NR system around the ATG gNB receives the corresponding RIM-RS, and compares the receiving power of the RIM-RS with a preset power threshold (i.e., a third threshold). If the receiving power is greater than the power threshold, it can be known that the base station gNB of ground NR system and the ATG gNB are high interference base stations to each other (i.e., the base station gNB of ground NR system is the second base station). The base station gNB of ground NR system reports the ID of the ATG gNB to establish a mapping relationship between the ID of the ATG gNB (i.e., the identifier of the first base station) and a gNB ID (i.e., the identifier of the second base station). Through statistics, a set of high interference base stations of the ground NR system corresponding to each ATG gNB can be known. As shown in FIG. 7a, taking a certain ATG gNB as an example in this implementation, gNB1, gNB2, and gNB3 are selected as the corresponding high interference ground base stations (second base stations), and a base station set of the ground NR system, including gNB1, gNB2, and gNB3, is formed.

In operation 2, an RIS device is placed for each of the high interference ground base stations gNB1, gNB2, and gNB3 selected in the previous operation. As shown in FIG. 7a, the ATG gNB, the RIS devices and the respective gNBs are not disposed in a line. When the locations of the respective RIS devices are determined, the incident angles of the incident beams of the interference signals are also determined from the locations of the RIS devices, the ATG eNB, and the high interference ground base stations.

As shown in FIG. 7b, in the case where downlink transmission from a base station of ground NR system interferes with uplink receiving of a base station of ATG system, in order to achieve better interference suppression, for gNB3, an intelligent reflective device RIS4 may be additionally placed to reflect an interference signal, because the interference signal is an effective signal for the ground NR system, the performance of the NR system can be enhanced in the covered area by reflecting the interference signal, and the original RIS3 device can be used to implement interference suppression of gNB3 on the ATG gNB.

In operation 3, according to the interference signal and the incident angle of the incident beam of the interference signal, a null algorithm, including but not limited to a minimum interference-to-noise ratio algorithm, is used to determine weight information of a reflected beam of the interference cancellation signal. When the interference from the ATG gNB is suppressed (as shown in FIG. 7a), the RIS devices correspond to weights $$\{W_1^{ATG2NR}, W_2^{ATG2NR}, W_3^{ATG2NR}\}.$$

The dashed line represents an incident beam of the interference signal from the ATG gNB to the gNB, while the dotted line represents a reflected beam of the interference cancellation signal generated by the RIS device. When the interference from the gNB is suppressed (as shown in FIG. 7b), the RIS devices generate weights $$\{W_1^{NR2ATG}, W_2^{NR2ATG}, W_3^{NR2ATG}, W_4^{NR2ATG}\}.$$

The dashed line represents an incident beam of the interference signal from the gNB to the ATG gNB, while the dotted line represents a reflected beam of the interference cancellation signal generated by the RIS device.

In operation 4, after the weight information is sent to the RIS device, at a moment where the ATG system is at a downlink slot and the ground NR system is at an uplink slot, the RIS devices their respective weight information enable $$\{W_1^{ATG2NR}, W_2^{ATG2NR}, W_3^{ATG2NR}\}$$

to form reflected beams of their respective interference cancellation signals, and at a moment where the ground NR system is at a downlink slot and the ATG system is at an uplink slot, the RIS devices enable their respective weight information $$\{W_1^{NR2ATG}, W_2^{NR2ATG}, W_3^{NR2ATG}, W_4^{NR2ATG}\}.$$

At any other moment, the RIS device may not enable the weight information, i.e., not reflect a beam, thereby achieving the purpose of energy saving.

In this implementation, the weight information and whether to enable the weight information may be transmitted by the ATG system through a transmission link (e.g., WIFI) installed on the RIS device, or may be acquired by a processing module configured on the RIS device.

In the case where the ATG system and the ground radio communication system use the same spectrum resources, mutual interference between the ATG system and the ground radio communication system is suppressed by introducing an RIS device in the present disclosure. With the solution of the present disclosure, an RIS device can be introduced into an existing ATG system, and selections in the placement location of the RIS device and weight information of the reflected beam therefrom can be optimized, thereby achieving the goal of reducing mutual interference between the air and ground radio systems, and further improving the system performance of each radio system.

Based on the same technical concept, the present disclosure further provides an air-ground co-frequency system interference suppression apparatus. As shown in FIG. 8, the air-ground co-frequency system interference suppression apparatus includes a first processing module 101, a second processing module 102 and a third processing module 103.

The first processing module 101 is configured to determine a base station set of a ground radio communication system corresponding to a first base station of an air to ground (ATG) system, where each second base station in the base station set and the first base station interfere with each other.

The second processing module 102 is configured to determine, for at least one second base station in the base station set, a location of a reconfigurable intelligent surface (RIS) device corresponding to the second base station, and determine an incident angle of an incident beam of an interference signal incident to the RIS device.

The third processing module 103 is configured to determine, according to the interference signal and the incident angle of the incident beam of the interference signal, weight information of a reflected beam of an interference cancellation signal so that the RIS device reflects the incident beam of the interference signal according to the weight information, to form the reflected beam of the interference cancellation signal to eliminate the interference signal.

In some implementations, the RIS device is an active device or a passive device, and when the RIS device is an active device, as shown in FIG. 9, the third processing module 103 is further configured to send, after determining the weight information of the reflected beam of the interference cancellation signal, the weight information to the RIS device.

In some implementations, the third processing module 103 is configured to calculate the weight information of the reflected beam of the interference cancellation signal with a minimum interference-to-noise ratio algorithm.

In some implementations, the ground radio communication system is a new radio (NR) communication system or a long term evolution (LTE) communication system, antennas of the first base station divides a space into a plurality of grids each corresponding to a set of antenna weights, and the first processing module 101 is configured to calculate, according to an adjacent cell interference and noise signal received by the first base station at different moments within a preset time length and antenna weights corresponding to respective grids, an interference power of an uplink subframe of the first base station in each grid direction within the time length; determine an interference direction according to the interference power of the uplink subframe of the first base station in each grid direction within the time length and a preset first threshold; and determine, according to the interference direction, a preset second threshold and a location of the first base station, a base station set of the ground radio communication system corresponding to the first base station.

In some implementations, the ground radio communication system is a new radio (NR) communication system, and the first processing module 101 is configured to determine, according to a mapping relationship between an identifier of the first base station and an identifier of the second base station, a base station set of the ground radio communication system corresponding to the first base station of the ATG system.

In some implementations, as shown in FIG. 9, the air-ground co-frequency system interference suppression apparatus further includes a receiving module 104 and a mapping relationship establishing module 105.

The receiving module 104 is configured to receive an identifier of the first base station reported by each second base station of the ground radio communication system, where the identifier of the first base station is sent from the second base station upon receiving from the first base station a remote interference management reference signal (RIM-RS) with a receiving power greater than a third threshold.

The mapping relationship establishing module 105 is configured to establish a mapping relationship between the identifier of the first base station and an identifier of the second base station, where the identifier of the second base station is an identifier of the second base station that sends the identifier of the first base station.

In some implementations, the second processing module 102 is configured to select a peripheral location of the second base station or the first base station, and set the selected location as a location of the RIS device corresponding to the second base station.

In some implementations, the location of the RIS device corresponding to the second base station is on a line of sight transmission path between the first base station and the second base station.

In some implementations, the interference signal includes a first interference signal of the first base station to the second base station, and a second interference signal of the second base station to the first base station; the interference cancellation signal includes a first interference cancellation signal of the first base station to the second base station, and a second interference cancellation signal of the second base station to the first base station; and the weight information includes first weight information of a first reflected beam of the first interference cancellation signal, and second weight information of a second reflected beam of the second interference cancellation signal.

In some implementations, the RIS device is an active device, and the third processing module 103 is configured to send the first weight information and the second weight information to the RIS device so that at a moment where the ATG system is at a downlink slot and the ground radio communication system is at an uplink slot, the RIS device reflects an incident beam of the first interference signal according to the first weight information to form a first reflected beam of the first interference cancellation signal, and at a moment where the ground radio communication system is at a downlink slot and the ATG system is at an uplink slot, the RIS device reflects an incident beam of the second interference signal according to the second weight information to form a second reflected beam of the second interference cancellation signal.

The present disclosure further provides an electronic device, including: one or more processors and a storage means. The storage means stores one or more programs thereon which, when executed by the one or more processors, cause the one or more processors to implement the air-ground co-frequency system interference suppression method as described in any of the above implementations.

The present disclosure further provides a computer-readable medium storing a computer program thereon, where the computer program, when executed by a processor, causes the air-ground co-frequency system interference suppression method as described in any of the above implementations to be implemented.

Those of ordinary skill in the art will appreciate that all or some operations of the above described method, functional modules/units in the apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). The term computer storage medium includes volatile and nonvolatile, removable and non-removable media implemented in any method or technology for storage of information such as computer-readable instructions, data structures, program modules or other data, as is well known to those of ordinary skill in the art. The computer storage medium includes, but is not limited to, an RAM, an ROM, an EEPROM, a flash or any other memory technology, a CD-ROM, a digital versatile disc (DVD) or any other optical disc storage, a magnetic cartridge, a magnetic tape, a magnetic disk storage or any other magnetic storage device, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed exemplary implementations, and although specific terms are employed, they are used and should be interpreted in a generic and descriptive sense only and not for purposes of limitation. In some instances, as would be apparent to one skilled in the art, features, characteristics and/or elements described in connection with a particular implementation may be used alone or in combination with features, characteristics and/or elements described in connection with another implementation, unless expressly stated otherwise. It will, therefore, be understood by those skilled in the art that various changes in form and details may be made therein without departing from the scope of the present disclosure as set forth in the appended claims.

What is claimed is:

1. An air-ground co-frequency system interference suppression method, comprising:
   determining a base station set of a ground radio communication system corresponding to a first base station of an air to ground (ATG) system, wherein each second base station in the base station set and the first base station interfere with each other;
   determining, for at least one second base station in the base station set, a location of a reconfigurable intelligent surface (RIS) device corresponding to the second base station, and
   determining an incident angle of an incident beam of an interference signal incident to the RIS device; and
   determining, according to the interference signal and the incident angle of the incident beam of the interference signal, weight information of a reflected beam of an interference cancellation signal, the weight information being used to control the RIS device to reflect the incident beam of the interference signal, so as to form the reflected beam of the interference cancellation signal to eliminate the interference signal;
   wherein determining the weight information of the reflected beam of the interference cancellation signal comprises: calculating the weight information of the reflected beam of the interference cancellation signal with a minimum interference-to-noise ratio algorithm.

2. The method according to claim 1, wherein the RIS device is an active device or a passive device, and when the RIS device is an active device, after determining the weight information of the reflected beam of the interference cancellation signal, the method further comprises: sending the weight information to the RIS device.

3. The method according to claim 1, wherein the ground radio communication system is a new radio (NR) communication system or a long term evolution (LTE) communication system, antennas of the first base station divides a space into a plurality of grids each corresponding to a set of antenna weights, and determining the base station set of the ground radio communication system corresponding to the first base station of the ATG system comprises:
   calculating, according to an adjacent cell interference and noise signal received by the first base station at different moments within a preset time length and antenna weights corresponding to respective grids, an interference power of an uplink subframe of the first base station in each grid direction within the time length;
   determining an interference direction according to the interference power of the uplink subframe of the first base station in each grid direction within the time length and a preset first threshold; and
   determining, according to the interference direction, a preset second threshold and a location of the first base station, a base station set of the ground radio communication system corresponding to the first base station.

4. The method according to claim 1, wherein the ground radio communication system is a new radio (NR) communication system, and determining the base station set of the ground radio communication system corresponding to the first base station of the ATG system comprises:
   determining, according to a mapping relationship between an identifier of the first base station and an identifier of the second base station, the base station set of the ground radio communication system corresponding to the first base station of the ATG system.

5. The method according to claim 4, further comprising establishing the mapping relationship, comprising:
   receiving an identifier of the first base station reported by each second base station of the ground radio communication system, wherein the identifier of the first base station is sent from the second base station upon receiving from the first base station a remote interference management reference signal (RIM-RS) with a receiving power greater than a third threshold; and
   establishing a mapping relationship between the identifier of the first base station and an identifier of the second base station, wherein the identifier of the second base station is an identifier of the second base station that sends the identifier of the first base station.

6. The method according to claim 1, wherein determining the location of the RIS device corresponding to the second base station comprises:
   selecting a peripheral location of the second base station or the first base station, and setting the selected location as the location of the RIS device corresponding to the second base station.

7. The method according to claim 6, wherein the location of the RIS device corresponding to the second base station is on a line of sight transmission path between the first base station and the second base station.

8. The method according to claim 1, wherein the interference signal comprises a first interference signal of the first base station to the second base station, and a second interference signal of the second base station to the first base station;

the interference cancellation signal comprises a first interference cancellation signal of the first base station to the second base station, and a second interference cancellation signal of the second base station to the first base station; and the weight information comprises first weight information of a first reflected beam of the first interference cancellation signal, and second weight information of a second reflected beam of the second interference cancellation signal.

9. The method according to claim 8, wherein the RIS device is an active device, and sending the weight information to the RIS device so that the RIS device reflects the incident beam of the interference signal according to the weight information, to form the reflected beam of the interference cancellation signal comprises:

sending the first weight information and the second weight information to the RIS device so that at a moment where the ATG system is at a downlink slot and the ground radio communication system is at an uplink slot, the RIS device reflects an incident beam of the first interference signal according to the first weight information to form the first reflected beam of the first interference cancellation signal, and at a moment where the ground radio communication system is at a downlink slot and the ATG system is at an uplink slot, the RIS device reflects an incident beam of the second interference signal according to the second weight information to form the second reflected beam of the second interference cancellation signal.

10. An air-ground co-frequency system interference suppression apparatus, comprising a processor and a storage device having instructions stored thereon which, when executed by the processor, cause the processor to:

determine a base station set of a ground radio communication system corresponding to a first base station of an air to ground (ATG) system, wherein each second base station in the base station set and the first base station interfere with each other;

determine, for at least one second base station in the base station set, a location of a reconfigurable intelligent surface (RIS) device corresponding to the second base station, and determine an incident angle of an incident beam of an interference signal incident to the RIS device; and determine, according to the interference signal and the incident angle of the incident beam of the interference signal, weight information of a reflected beam of an interference cancellation signal, the weight information being used to control the RIS device to reflect the incident beam of the interference signal, so as to form the reflected beam of the interference cancellation signal to eliminate the interference signal;

wherein determining the weight information of the reflected beam of the interference cancellation signal comprises: calculating the weight information of the reflected beam of the interference cancellation signal with a minimum interference-to-noise ratio algorithm.

11. An electronic device, comprising:

one or more processors;

a storage means having one or more programs stored thereon; wherein the one or more programs, when executed by the one or more processors, cause the one or more processors to implement the air-ground co-frequency system interference suppression method according to claim 1.

12. A computer-readable medium storing a computer program thereon, wherein the program, when executed by a processor, causes the air-ground co-frequency system interference suppression method according to claim 1 to be implemented.

13. The method according to claim 2, wherein determining the weight information of the reflected beam of the interference cancellation signal comprises:

calculating the weight information of the reflected beam of the interference cancellation signal with a minimum interference-to-noise ratio algorithm.

14. The method according to claim 2, wherein the interference signal comprises a first interference signal of the first base station to the second base station, and a second interference signal of the second base station to the first base station;

the interference cancellation signal comprises a first interference cancellation signal of the first base station to the second base station, and a second interference cancellation signal of the second base station to the first base station; and the weight information comprises first weight information of a first reflected beam of the first interference cancellation signal, and second weight information of a second reflected beam of the second interference cancellation signal.

15. The method according to claim 3, wherein the interference signal comprises a first interference signal of the first base station to the second base station, and a second interference signal of the second base station to the first base station;

the interference cancellation signal comprises a first interference cancellation signal of the first base station to the second base station, and a second interference cancellation signal of the second base station to the first base station; and the weight information comprises first weight information of a first reflected beam of the first interference cancellation signal, and second weight information of a second reflected beam of the second interference cancellation signal.

16. The method according to claim 4, wherein the interference signal comprises a first interference signal of the first base station to the second base station, and a second interference signal of the second base station to the first base station;

the interference cancellation signal comprises a first interference cancellation signal of the first base station to the second base station, and a second interference cancellation signal of the second base station to the first base station; and the weight information comprises first weight information of a first reflected beam of the first interference cancellation signal, and second weight information of a second reflected beam of the second interference cancellation signal.

17. The method according to claim 5, wherein the interference signal comprises a first interference signal of the first base station to the second base station, and a second interference signal of the second base station to the first base station;

the interference cancellation signal comprises a first interference cancellation signal of the first base station to the second base station, and a second interference cancellation signal of the second base station to the first base station; and the weight information comprises first weight information of a first reflected beam of the first interference cancellation signal, and second weight information of a second reflected beam of the second interference cancellation signal.

18. The method according to claim 6, wherein the interference signal comprises a first interference signal of the first base station to the second base station, and a second interference signal of the second base station to the first base station;

the interference cancellation signal comprises a first interference cancellation signal of the first base station to the second base station, and a second interference cancellation signal of the second base station to the first base station; and the weight information comprises first weight information of a first reflected beam of the first interference cancellation signal, and second weight information of a second reflected beam of the second interference cancellation signal.

19. The method according to claim 7, wherein the interference signal comprises a first interference signal of the first base station to the second base station, and a second interference signal of the second base station to the first base station;

the interference cancellation signal comprises a first interference cancellation signal of the first base station to the second base station, and a second interference cancellation signal of the second base station to the first base station; and the weight information comprises first weight information of a first reflected beam of the first interference cancellation signal, and second weight information of a second reflected beam of the second interference cancellation signal.

\*   \*   \*   \*   \*